United States Patent
Hari et al.

(10) Patent No.: US 10,817,289 B2
(45) Date of Patent: Oct. 27, 2020

(54) OPTIMIZING SOFTWARE-DIRECTED INSTRUCTION REPLICATION FOR GPU ERROR DETECTION

(71) Applicant: NVIDIA Corp., Santa Clara, CA (US)

(72) Inventors: Siva Hari, Santa Clara, CA (US); Michael Sullivan, San Jose, CA (US); Timothy Tsai, Santa Clara, CA (US); Stephen W. Keckler, Austin, TX (US); Abdulrahman Mahmoud, Savoy, IL (US)

(73) Assignee: NVIDIA Corp., Santa Clara, CA (US)

( * ) Notice: Subject to any disclaimer, the term of this patent is extended or adjusted under 35 U.S.C. 154(b) by 100 days.

(21) Appl. No.: 16/150,410

(22) Filed: Oct. 3, 2018

(65) Prior Publication Data
US 2019/0102180 A1    Apr. 4, 2019

Related U.S. Application Data

(60) Provisional application No. 62/567,564, filed on Oct. 3, 2017.

(51) Int. Cl.
*G06F 11/14*    (2006.01)
*G06F 9/30*    (2018.01)
*G06F 11/10*    (2006.01)

(52) U.S. Cl.
CPC ...... *G06F 9/30029* (2013.01); *G06F 9/30032* (2013.01); *G06F 9/30101* (2013.01); *G06F 11/1044* (2013.01)

(58) Field of Classification Search
CPC ............ G06F 9/30076; G06F 11/1405; G06F 11/1492
See application file for complete search history.

(56) References Cited

U.S. PATENT DOCUMENTS

| | | | | |
|---|---|---|---|---|
| 2002/0199175 | A1* | 12/2002 | Saulsbury | G06F 11/1492 717/141 |
| 2005/0108509 | A1* | 5/2005 | Safford | G06F 9/30181 712/215 |
| 2010/0281239 | A1* | 11/2010 | Sudhakar | G06F 9/30189 712/222 |
| 2017/0364332 | A1* | 12/2017 | Lowell | G06F 8/41 |

OTHER PUBLICATIONS

SWIFT: Software Implemented Fault Tolerance REIS etal, CGO'2005
Understanding Software Approaches for GPGPU Reliability Dimitrov etal, 2009, ACM.
Warped-DMR: Light-weight Error Detection for GPGPU Jeon etal, 2012, IEEE.

* cited by examiner

*Primary Examiner* — Jacob Petranek
(74) *Attorney, Agent, or Firm* — Rowan TELS LLC

(57) ABSTRACT

Software-only and software-hardware optimizations to reduce the overhead of intra-thread instruction duplication on a GPU or other instruction processor are disclosed. The optimizations trade off error containment for performance and include ISA extensions with limited hardware changes and area costs.

16 Claims, 8 Drawing Sheets

Original Add Instruction  602

```
ADD R1, R2, R3
```

Naïve Verification Code for *Simple*

```
    ADD R4, R2, R3
    ADD R1, R2, R3
    ISETP.EQ P0, R4, R1
@p0 BRA.U `(.L_1)
    BPT.TRAP 0x1
.L_1:
```
604

*FastSig:* Signature-based Checking

```
    #reset signature
    MOV R0, 0x0
    .
    ADD R4, R2, R3
    ADD R1, R2, R3
    LOP3.xor.or R0, R0, R4, R1
    .
    ISETP.EQ P0, R4, R1
@p0 BRA.U `(.L_1)
    BPT.TRAP 0x1
.L_1:
    EXIT
```
606

*HW-Compare:* Hardware Compare and Trap

```
ADD R4, R2, R3
ADD R1, R2, R3
LOP.xor.trap R4, R1
```
608

*HW-Sig:* Hardware Signature-based Checking

```
ADD.sig RZ, R2, R3
ADD.sig R4, R2, R3
```
610

FIG. 6

OPTIMIZING SOFTWARE-DIRECTED INSTRUCTION REPLICATION FOR GPU ERROR DETECTION

CROSS REFERENCE TO RELATED APPLICATIONS

This application claims the benefit of U.S. provisional patent application Ser. No. 62/567,564, filed on Oct. 3, 2017 the contents of which are incorporated herein by reference in their entirety.

GOVERNMENT LICENSE RIGHTS

This invention was made with US Government support under Lawrence Livermore National Laboratory subcontract B620719 awarded by the Department of Energy. The US Government has certain rights in this invention.

BACKGROUND

Transient hardware errors from high-energy particle strikes (also known as soft-errors) are of concern for high performance and safety-critical systems because they can silently corrupt execution results. Any application with large scale running on high performance computing (HPC) systems in terms of memory and resource usage will be vulnerable to an error rate that is roughly proportional to the scale. Some HPC systems are required to demonstrate very low error levels. As graphics processing units (GPUs) become more pervasive in such systems, designers must ensure that the computations that are offloaded to them are resilient to transient errors. The state-of-the-art GPUs used in these markets employ error correcting code (ECC) or parity protection for major storage structures such as dynamic random-access memory (DRAM), caches, and the register file. Without data path reliability mechanisms, however, such systems may not be able to maintain high reliability at future error rates and system scales.

Prior software-based techniques to address these issues have introduced redundancy through software at multiple granularities, such as at the process, GPU kernel, thread, and assembly instruction level. Process-level redundancy replicates the process and compares results at system call boundaries. This approach suffers from limitations for multi-threaded workloads. Kernels or thread blocks can be re-executed and their outputs then compared to ensure correctness. This approach is challenging for workloads where the kernel or block outputs are non-deterministic, which can arise from rounding errors and reading clock values during execution, for example.

Thread-level duplication (also called redundant multi-threading or RMT) has also been employed for central processing units (CPUs) and GPUs. Researchers have shown that an automatic compiler transformation can be used to create redundant threads, managing both communication and synchronization of operations that exit the sphere-of-replication. On GPUs, duplicating at the thread level produces high overhead due to cross-block communication and synchronization overhead.

While the thread-level duplication has lower overhead, programmers must ensure that the spare hardware resources are available because streaming multiprocessors support a fixed number of threads per thread block. If the duplicated thread is placed within the same warp, the original warp must be split into two warps, which affects programs that rely on intra-warp communication constructs such as warp vote and shuffle operations.

Software instruction-level duplication has been explored for CPUs, but not GPUs. Techniques have been proposed to duplicate instructions at the assembly level and insert checking instructions to validate the results for CPUs. Others have proposed a compiler-based approach and exploited wide, underutilized processors by scheduling both original and duplicated instructions in the same CPU thread.

BRIEF SUMMARY

Disclosed herein are processes and systems to utilize assembly-level instruction duplication on GPUs, with cooperative software-only and software-hardware performance optimizations that significantly lower the overhead of these techniques on GPUs specifically. The techniques lend themselves to quantification of overhead using conventional methods. Some of the techniques trade-off error containment for lower performance overhead.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 6 illustrates various logic for verifying data flow integrity in a data processor.

DETAILED DESCRIPTION

Figure 1:
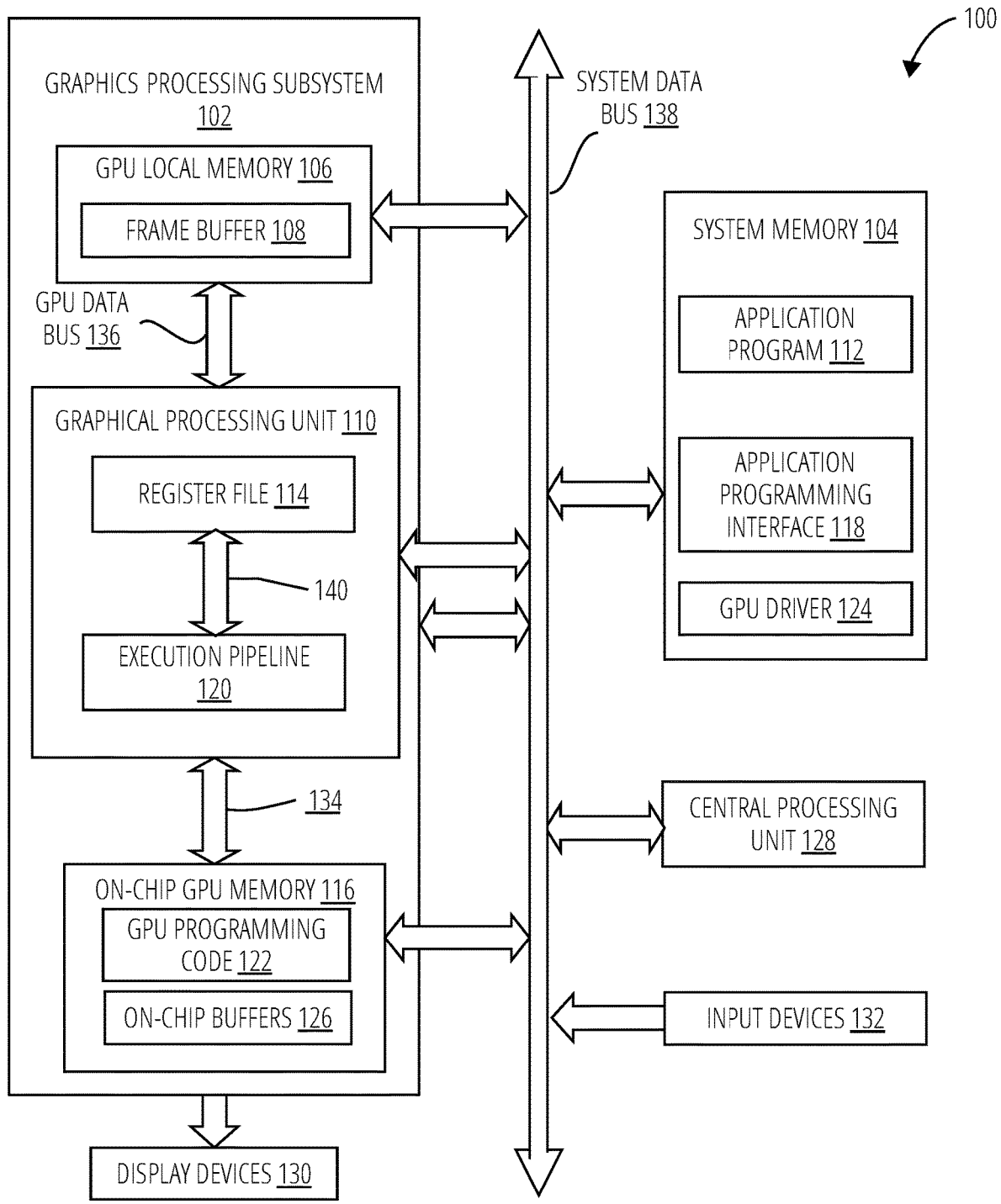
FIG. 1 is a block diagram of a computing system 100 within which the logic improvements introduced herein may be embodied or carried out.

The following three factors are large contributors of overhead to assembly-level instruction duplication in GPUs:
  1. additional verification and notification instructions;
  2. increased register requirements per thread (due to duplicated register space); and
  3. duplicated instructions.

To mitigate the overhead incurred from additional verification and notification instructions, an optimization is disclosed to defer error notification, with no loss in error coverage. A flag is created and reset once, before the first error check instruction, which in one embodiment is at the beginning of the GPU kernel. This flag is set on any original and redundant values mismatch. For load/store implementations, the original and redundant values to compare will typically be stored in registers, however, other embodiments may compare instruction output values stored in different locations, such as the memory hierarchy (Level 1 cache, MMU etc.) At the end of the kernel a trap is raised to notify the higher level (e.g., GPU device driver of the operating system) if the flag is set. Comparing the two register values and updating the flag are fast operations, for example implemented by performing an XOR between the two register values and ORing the result with the flag using a single LOP3 operation. This may be referred to as a "software-only" optimization.

Increasing the register requirement per thread may significantly affect performance for some workloads where the register file is a critical resource (the second overhead source). A trade off may be made between the number of additional verification instructions, and register usage. Embodiments disclosed herein may reduce the average runtime register overhead to 35%, for example.

The software-only optimization may compromise error containment for performance. In another embodiment, an instruction set architecture (ISA) extension may be utilized for error containment without loss in coverage and performance. To this end, an embodiment comprising an instruction that compares two values and raises a trap in hardware is disclosed.

An embodiment comprising a second ISA extension is also disclosed, comprising hardware changes to the GPU Streaming Multiprocessor (SM) to eliminate the need for verification and notification instructions, without sacrificing error coverage. This extension accelerates the software-only optimization by maintaining the flag in hardware and incorporating each of the original and redundant instructions to XOR the result into the flag. Once all the instructions have executed (same number of original and redundant) the flag register should (in fault-free scenarios) have a zero value. This scheme, like the software-only optimization, relaxes error containment somewhat. The average runtime overhead of this technique is 28%.

In summary, the following embodiments are disclosed herein:
1. A GPU-specific software optimization that performs fast compare and flag update operation using a single GPU instruction (LOP3);
2. An ISA extension such that two register values may be compared and a trap (e.g., an interrupt or other assertion instruction) may be raised on a value mismatch; and
3. An ISA extension and hardware support to maintain the flag register in hardware to eliminate the use of verification instructions altogether. The flag register may be either a general-purpose register or a dedicated flag register. A dedicated register may be preferred as it introduces relatively low die area overhead to the GPU, and provides faster access, no general-purpose register contention).

FIG. 1 is a block diagram of one embodiment of a computing system 100 in which one or more aspects of the invention may be implemented or carried out. The computing system 100 includes a system data bus 138, a CPU 128, input devices 132, a system memory 104, a graphics processing subsystem 102, and display devices 130. In alternate embodiments, the CPU 128, portions of the graphics processing subsystem 102, the system data bus 138, or any combination thereof, may be integrated into a single processing unit. Further, the functionality of the graphics processing subsystem 102 may be included in a chipset or in some other type of special purpose processing unit or co-processor.

As shown, the system data bus 138 connects the CPU 128, the input devices 132, the system memory 104, and the graphics processing subsystem 102. In alternate embodiments, the system memory 104 may connect directly to the CPU 128. The CPU 128 receives user input from the input devices 132, executes programming instructions stored in the system memory 104, operates on data stored in the system memory 104, and configures the graphics processing subsystem 102 to perform specific tasks in an execution pipeline. The system memory 104 typically includes dynamic random access memory (DRAM) employed to store programming instructions and data for processing by the CPU 128 and the graphics processing subsystem 102. The graphics processing subsystem 102 receives instructions transmitted by the CPU 128 and processes the instructions to perform various graphics and computational tasks.

As also shown, the system memory 104 includes an application program 112, an API 118 (application programming interface), and a graphics processing unit driver 124 (GPU driver). The application program 112 generates calls to the API 118 to produce a desired set of results. The API 118 functionality is typically implemented within the graphics processing unit driver 124.

The graphics processing subsystem 102 includes a GPU 110 (graphics processing unit), an on-chip GPU memory 116, an on-chip GPU data bus 134, a GPU local memory 106, and a GPU data bus 136. The GPU 110 is configured to communicate with the on-chip GPU memory 116 via the on-chip GPU data bus 134 and with the GPU local memory 106 via the GPU data bus 136. The GPU 110 may receive instructions transmitted by the CPU 128, process the instructions, and store results in the GPU local memory 106.

The GPU 110 includes one or more register file 114 and execution pipeline 120 that interact via an on-chip bus 140. The various error detecting and correcting schemes disclosed herein detect and in some cases correct for data corruption that takes place in the execution pipeline 120, during data exchange over the on-chip bus 140, and for data storage errors in the register file 114.

The GPU 110 may be provided with any amount of on-chip GPU memory 116 and GPU local memory 106, including none, and may employ on-chip GPU memory 116, GPU local memory 106, and system memory 104 in any combination for memory operations.

The on-chip GPU memory 116 is configured to include GPU programming 122 and on-Chip Buffers 126. The GPU programming 122 may be transmitted from the graphics processing unit driver 124 to the on-chip GPU memory 116 via the system data bus 138. The on-Chip Buffers 126 are typically employed to store data that requires fast access to reduce the latency of the processing in the graphics pipeline. Because the on-chip GPU memory 116 takes up valuable die area, it is relatively expensive.

The GPU local memory 106 typically includes less expensive off-chip dynamic random-access memory (DRAM) and is also employed to store data and programming employed by the GPU 110. As shown, the GPU local memory 106 includes a frame buffer 108. The frame buffer 108 stores data for data that may be applied to drive the display devices 130.

The display devices 130 are one or more output devices capable of emitting a visual image corresponding to an input data signal. For example, a display device may be built using a cathode ray tube (CRT) monitor, a liquid crystal display, or any other suitable display system. The input data signals to the display devices 130 are typically generated by scanning out the contents of one or more frames of image data that is stored in the frame buffer 108.

Figure 2:
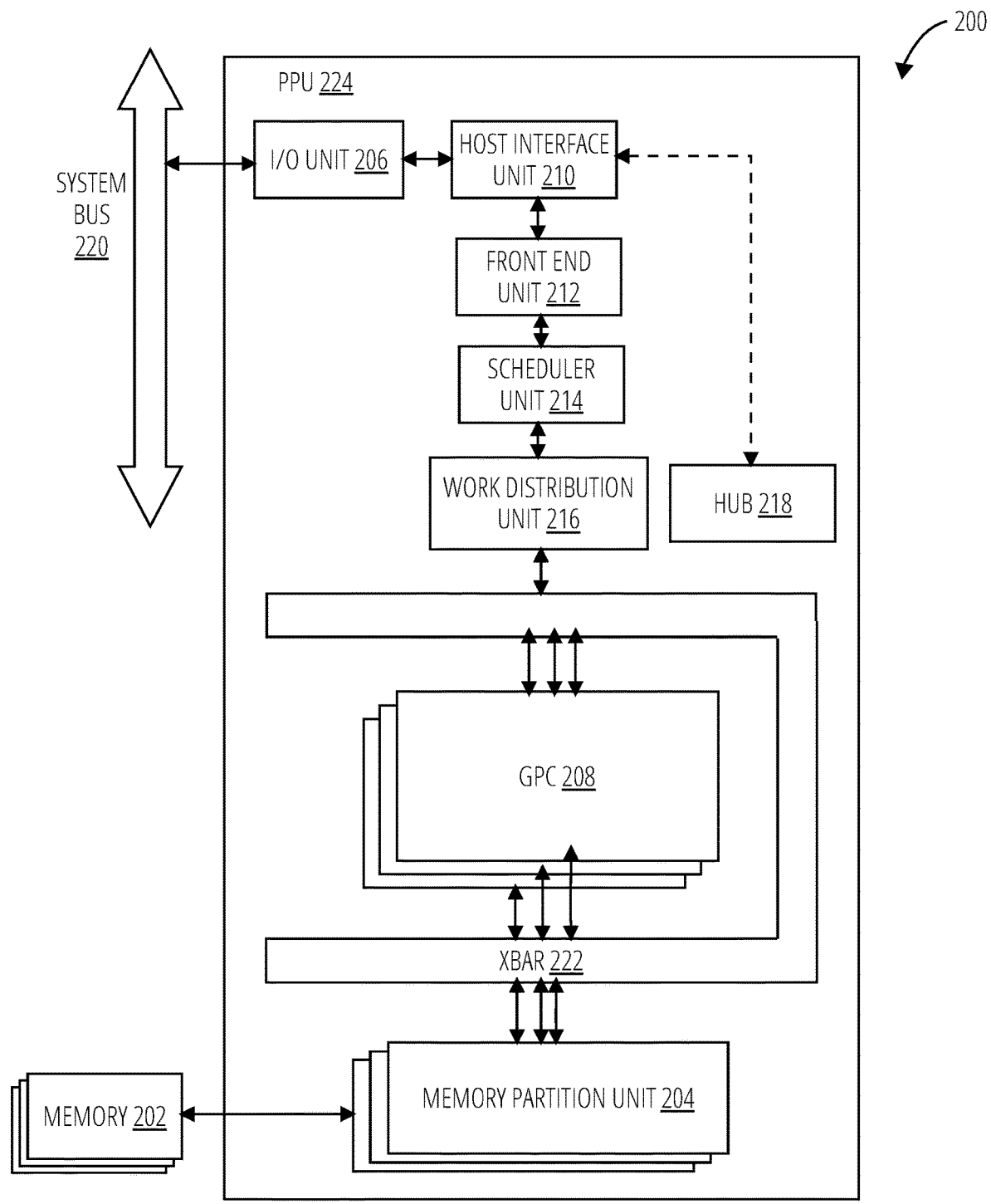
FIG. 2 illustrates a parallel processing architecture 200 in accordance with one embodiment.

FIG. 2 illustrates a parallel processing architecture 200 in accordance with one embodiment, in which the various schemes disclosed herein may be implemented or utilized. In one embodiment, the parallel processing architecture 200 includes a parallel processing unit (PPU 224) that is a multi-threaded processor implemented on one or more integrated circuit devices. The parallel processing architecture 200 is a latency reducing architecture designed to process a large number of threads in parallel. A thread (i.e., a thread of execution) is an instantiation of a set of instructions configured to be executed by the parallel processing architecture 200. In one embodiment, the PPU 224 is a graphics processing unit (GPU) configured to implement a graphics rendering pipeline for image data for display on a display device such as a liquid crystal display (LCD) device. In other embodiments, the parallel processing architecture 200 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

As shown in FIG. 2, the PPU 224 includes an I/O unit 206 (input/output unit), a host interface unit 210, a front-end unit 212, a scheduler unit 214, a work distribution unit 216, a hub 218, an xbar 222 (crossbar), one or more GPC 208 (general processing cluster), and one or more memory partition unit 204. The PPU 224 may be connected to a host processor or other peripheral devices via a system bus 220. The PPU 224 may also be connected to a local memory comprising a number of memory devices 202. In one embodiment, the local memory may comprise a number of dynamic random-access memory (DRAM) devices.

The I/O unit 206 is configured to transmit and receive communications (i.e., commands, data, etc.) from a host processor (not shown) over the system bus 220. The I/O unit 206 may communicate with the host processor directly via the system bus 220 or through one or more intermediate devices such as a memory bridge. In one embodiment, the I/O unit 206 implements a Peripheral Component Interconnect Express (PCIe) interface for communications over a PCIe bus. In alternative embodiments, the I/O unit 206 may implement other types of well-known interfaces for communicating with external devices.

The I/O unit 206 is coupled to a host interface unit 210 that decodes packets received via the system bus 220. In one embodiment, the packets represent commands configured to cause the PPU 224 to perform various operations. The host interface unit 210 transmits the decoded commands to various other units of the parallel processing architecture 200 as the commands may specify. For example, some commands may be transmitted to the front-end unit 212. Other commands may be transmitted to the hub 218 or other units of the PPU 224 such as one or more copy engines, a video encoder, a video decoder, a power management unit, etc. (not explicitly shown). In other words, the host interface unit 210 is configured to route communications between and among the various logical units of the PPU 224.

In one embodiment, a program executed by the host processor encodes a command stream in a buffer that provides workloads to the PPU 224 for processing. A workload may comprise a number of instructions and data to be processed by those instructions. The buffer is a region in a memory that is accessible (i.e., read/write) by both the host processor and the PPU 224. For example, the host interface unit 210 may be configured to access the buffer in a system memory connected to the system bus 220 via memory requests transmitted over the system bus 220 by the I/O unit 206. In one embodiment, the host processor writes the command stream to the buffer and then transmits a pointer to the start of the command stream to the PPU 224. The host interface unit 210 provides the front-end unit 212 with pointers to one or more command streams. The front-end unit 212 manages the one or more streams, reading commands from the streams and forwarding commands to the various units of the PPU 224.

The front-end unit 212 is coupled to a scheduler unit 214 that configures the GPC 208 to process tasks defined by the one or more streams. The scheduler unit 214 is configured to track state information related to the various tasks managed by the scheduler unit 214. The state may indicate which GPC 208 a task is assigned to, whether the task is active or inactive, a priority level associated with the task, and so forth. The scheduler unit 214 manages the execution of a plurality of tasks on the one or more GPC 208.

The scheduler unit 214 is coupled to a work distribution unit 216 that is configured to dispatch tasks for execution on the GPC 208. The work distribution unit 216 may track a number of scheduled tasks received from the scheduler unit 214. In one embodiment, the work distribution unit 216 manages a pending task pool and an active task pool for each GPC 208. The pending task pool may comprise a number of slots (e.g., 16 slots) that contain tasks assigned to be processed by a particular GPC 208. The active task pool may comprise a number of slots (e.g., 4 slots) for tasks that are actively being processed by each GPC 208. As a GPC 208 finishes the execution of a task, that task is evicted from the active task pool for the GPC 208 and one of the other tasks from the pending task pool is selected and scheduled for execution on the GPC 208. If an active task has been idle on the GPC 208, such as while waiting for a data dependency to be resolved, then the active task may be evicted from the GPC 208 and returned to the pending task pool while another task in the pending task pool is selected and scheduled for execution on the GPC 208.

The work distribution unit 216 communicates with the one or more GPC 208 via an xbar 222. The xbar 222 is an interconnect network that couples many of the units of the PPU 224 to other units of the PPU 224. For example, the xbar 222 may be configured to couple the work distribution unit 216 to a particular GPC 208. Although not shown explicitly, one or more other units of the PPU 224 are coupled to the host interface unit 210. The other units may also be connected to the xbar 222 via a hub 218.

The tasks are managed by the scheduler unit 214 and dispatched to a GPC 208 by the work distribution unit 216. The GPC 208 is configured to process the task and generate results. The results may be consumed by other tasks within the GPC 208, routed to a different GPC 208 via the xbar 222, or stored in the memory devices 202. The results can be written to the memory devices 202 via the memory partition unit 204, which implement a memory interface for reading and writing data to/from the memory devices 202. In one embodiment, the PPU 224 includes a number U of memory partition unit 204 that is equal to the number of separate and distinct memory devices 202 coupled to the PPU 224.

In one embodiment, a host processor executes a driver kernel that implements an application programming interface (API) that enables one or more applications executing on the host processor to schedule operations for execution on the PPU 224. An application may generate instructions (i.e., API calls) that cause the driver kernel to generate one or more tasks for execution by the PPU 224. The driver kernel outputs tasks to one or more streams being processed by the PPU 224. Each task may comprise one or more groups of related threads, referred to herein as a warp. A thread block may refer to a plurality of groups of threads including instructions to perform the task. Threads in the same group of threads may exchange data through shared memory. In one embodiment, a group of threads comprises 32 related threads.

NVIDIA® GPU programming models utilize thousands of threads. Threads are grouped into 32-element warps to improve efficiency. The threads in each warp execute in a SIMT (single instruction, multiple thread) fashion, all fetching from a single Program Counter (PC) in the absence of divergent conditional branch instructions. Many warps are then assigned to execute concurrently on a single GPU core, or streaming multiprocessor (SM). A GPU consists of many SMs attached to a memory hierarchy that includes SM-local scratchpad memories and L1 caches, a shared L2 cache, and multiple DRAM channels. Different GPUs deploy differing numbers of SMs, L2 slices, and memory channels to differentiate on power and performance.

On GPUs manufactured by NVIDIA, users can design parallel programs using high-level programming languages such as CUDA or OpenCL. The code that executes on the GPU is referred to as a shader or kernel. Programmers use a front-end compiler, such as NVIDIA's NVVM, to generate intermediate code in a virtual ISA called parallel thread execution (PTX). PTX exposes the GPU as a data-parallel computing device by providing a stable programming model and instruction set for general purpose parallel programming, but it does not run directly on the GPU.

A backend compiler optimizes and translates PTX instructions into machine code that can run on the device. NVIDIA's native ISA is called SASS. For compute shaders, the backend compiler can be invoked in two ways: (1) ahead-of-time compilation of compute kernels via a PTX assembler (PTXAS), and (2) a JIT-time compiler in the display driver can compile a PTX representation of the kernel if it is available in the binary.

In the following description of FIGS. 3-5, reference is made to an "integrity verifier". "Integrity verifier" in this context refers to the logic that generates the instrumented code to perform verification at runtime, not the instrumented code itself. Thus a process step such as "compare for each of the original instruction" is a step taken by the instrumented code when executed. The corresponding step of the integrity verifier is to generate one or more instructions to perform the comparison.

Figure 3:
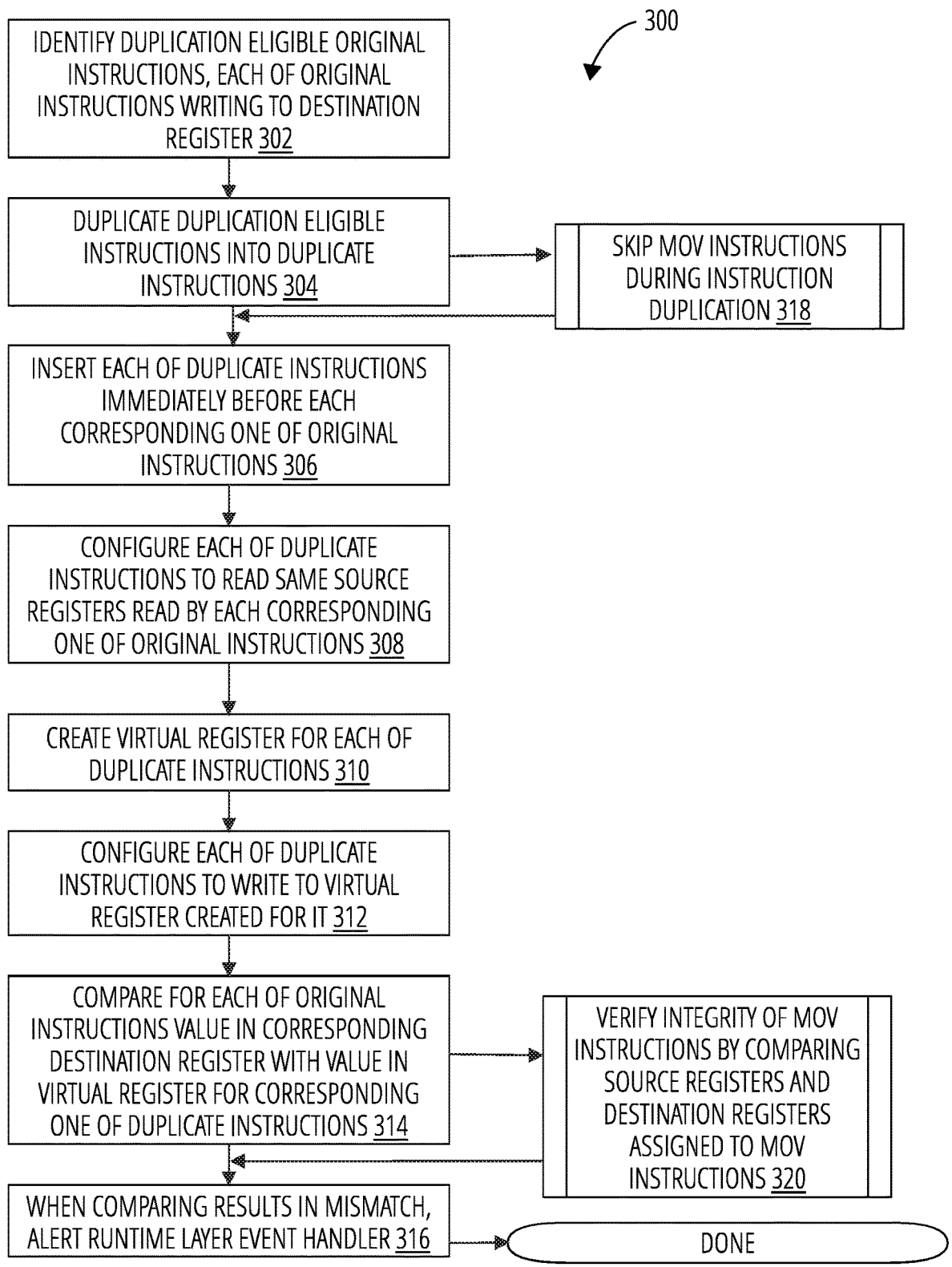
FIG. 3 illustrates a first-type integrity verifier 300 in accordance with one embodiment.

FIG. 3 illustrates a first-type integrity verifier 300 (herein, also called "SRIV", which is an abbreviation for Single Register space, Immediate Verification) in accordance with one embodiment. Duplicate instructions are created and inserted next to duplication eligible instructions. In block 302, the first-type integrity verifier 300 identifies duplication eligible original instructions, each writing to a destination register. In block 304, the first-type integrity verifier 300 duplicates the duplication eligible instructions into duplicate instructions. In block 306, first-type integrity verifier 300 inserts each of the duplicate instructions immediately before each corresponding one of the original instructions. This algorithm may be implemented in the back-end compiler (block 706 of FIG. 7).

Virtual registers are created for the outputs of the duplicate instructions. The virtual registers are later mapped to physical registers (see block 814 of FIG. 8). Virtual registers are placeholder register references generated by the compiler that, at execution time, have been mapped to physical registers. In block 308, the first-type integrity verifier 300 configures each of the duplicate instructions to read the same source registers read by each corresponding one of the original instructions. In block 310, the first-type integrity verifier 300 creates a virtual register for each of the duplicate instructions. In block 312, the first-type integrity verifier 300 configures each of the duplicate instructions to write to the virtual register created for it.

Results of the duplicate instructions and original instructions are compared and an alert is raised if there is a mismatch. In block 314, the first-type integrity verifier 300 compares for each of the original instructions a value in the corresponding destination register with a value in the virtual register for the corresponding one of the duplicate instructions. In block 316, the first-type integrity verifier 300 detects when the comparing results in a mismatch, and alerts a runtime layer event handler. For example, the device driver may be notified for further action by an alert or interrupt instruction.

An optimization of the "SRIV" first-type integrity verifier 300 involves skipping duplication of MOV instructions (subroutine block 318), and verifying the integrity of the MOV instructions by comparing the source registers and destination registers of the un-duplicated MOV instructions (subroutine block 320).

The original destination registers are replaced in the duplicate instructions with virtual registers. Because the original instruction may overwrite its source operand and the duplicate instruction should generate the same result as the original instruction using the same source operands, the duplicate instruction is inserted before the original instruction. Next, verification instructions are inserted to compare the original and virtual register values after the original instruction. Verification and notification involve a comparison operation, a conditional branch instruction, and a trap instruction (e.g., BPT) to notify error-handling logic (e.g., a runtime layer executed by the GPU or CPU) of an error.

The runtime overhead of instruction duplication has three main contributors: (1) verification and notification instructions, (2) increased register requirements per thread, and (3) duplicated instructions.

To address the first overhead source, optimizations are herein disclosed that reduce the runtime overhead due to verification and notification instructions, by deferring error checking, with no loss in error coverage. The first-type integrity verifier 300 may increase the register requirement per thread to an extent that significantly affects performance for workloads where the register file is a critical resource. Thus, a possible tradeoff is between a number of verification instructions and register usage. Efficient hardware extensions are disclosed to speed up the verification and notification instructions beyond what the software optimizations achieve. Also disclosed is a hardware option to eliminate the first two sources of overhead altogether.

Figure 4:
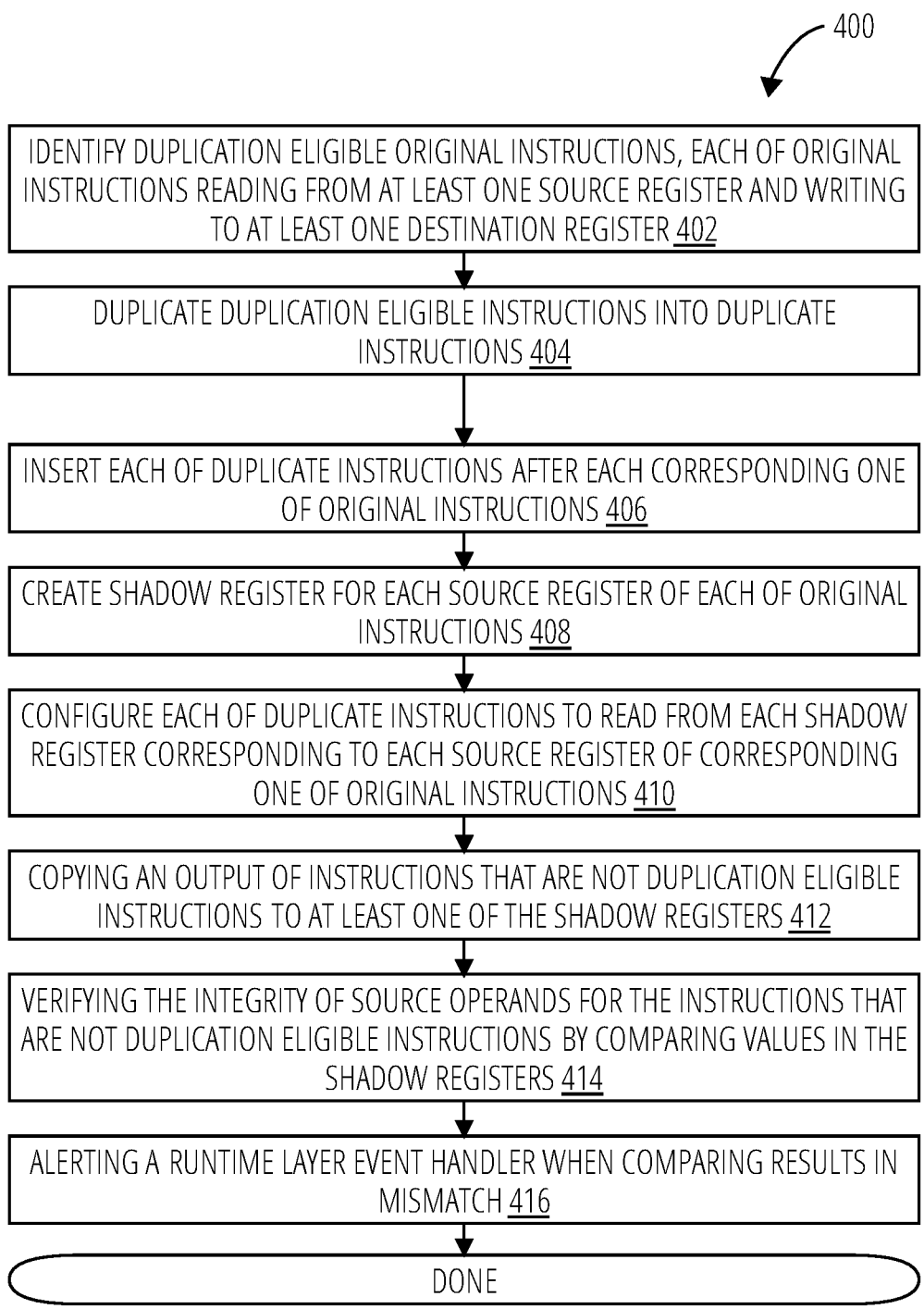
FIG. 4 illustrates another second-type integrity verifier 400 routine in accordance with one embodiment.

FIG. 4 illustrates a second-type integrity verifier 400 routine (herein, also called "DRDV", which is an abbreviation for Double Register space, Delayed Verification) in accordance with one embodiment. Duplicate instructions are created and inserted next to duplication eligible instructions. In block 402, the second-type integrity verifier 400 identifies duplication eligible original instructions, each of the original instructions reading from at least one source register and writing to at least one destination register. In block 404, the second-type integrity verifier 400 duplicates the duplication eligible instructions into duplicate instructions. In block 406, the second-type integrity verifier 400 inserts each of the duplicate instructions after each corresponding one of the original instructions.

The "DRDV" second-type integrity verifier 400 creates a shadow (e.g., duplicate virtual) register space for verifying the integrity of results produced by instructions that are not duplication eligible instructions. In block 408, the second-type integrity verifier 400 creates a shadow register for each source register of each of the original instructions. In block 410, the second-type integrity verifier 400 configures each of the duplicate instructions to read from each shadow register corresponding to each source register of the corresponding one of the original instructions.

Verification of the data flow through the instructions that are not duplication eligible instructions is accomplished by making comparisons in the shadow register space. In block 412, the second-type integrity verifier 400 copies an output of instructions that are not duplication eligible instructions to at least one of the shadow registers, verifying the integrity of source operands for the instructions that are not duplication eligible instructions by comparing values in the shadow registers (block 414), and alerting a runtime layer event handler in the event of a mismatch (block 416).

An optional optimization is to skip the verifying for values in the shadow registers that have not changed since a prior verification of those values.

The duplicate instruction is inserted after the original instruction and map the registers used by it into a shadow register space. For all non-duplicated copy eligible instructions, insert a move instruction to copy the destination register value into the shadow register space so that duplicated instructions can use it. Finally, insert verification instructions to check original and shadow register values for all inputs to non-duplicated instructions. This approach reduces the verification overhead (compared to the "SRIV" first-type integrity verifier 300) by chaining multiple replicated instructions on the path to a single verification.

An embodiment of an algorithm for implementing the second-type integrity verifier 400 is as follows:

```
create list of original instructions
clear original to shadow register mapping
for each instruction in the function do
    if instruction is duplication-eligible and original then
        duplicate instruction
        for all operands in the duplicate instruction do
            if shadow register does not exist then
                create a shadow register for the source
            end
            replace original register to shadow register
        end
    else if instruction is copy eligible and original then
        insert a move instruction copy the destination register
        value to the shadow space
    end
end
for each instruction in the function do
    if instruction is not duplication eligible and is original
    then
        for all sources in this instruction do
            verify original and shadow registers have same
            value
            if values are different then
                notify error to higher level (trap)
            end
        end
    end
end
```

The "DRDV" second-type integrity verifier 400 doubles the virtual register requirement per thread. Executing a code compiler's register allocator after the instruction duplication pass may reduce the real register usage per thread. However, the second-type integrity verifier 400 can result in significant execution slowdown for workloads in which the register file is a critical resource. This may either reduce the number of threads that run in parallel or increase the number of register spill/fill instructions that save/restore register content to/from local memory to limit the use of physical registers. If the total number of (original plus shadow) registers utilized exceeds the total available physical registers, some register values will need to be temporarily saved to memory (RAM) and later restored from memory. This process is referred to herein as spilling and filling. The first-type integrity verifier 300 provides a potential trade-off because it does not alter the original applications register requirement much, but it executes more dynamic instructions. This trade-off can benefit some workloads, especially when the register file is a critical resource.

A selection algorithm may be utilized by the compiler to analyze these tradeoffs for a particular code section and to select either first-type integrity verifier 300 or the second-type integrity verifier 400 for the code duplication technique accordingly.

Figure 5:
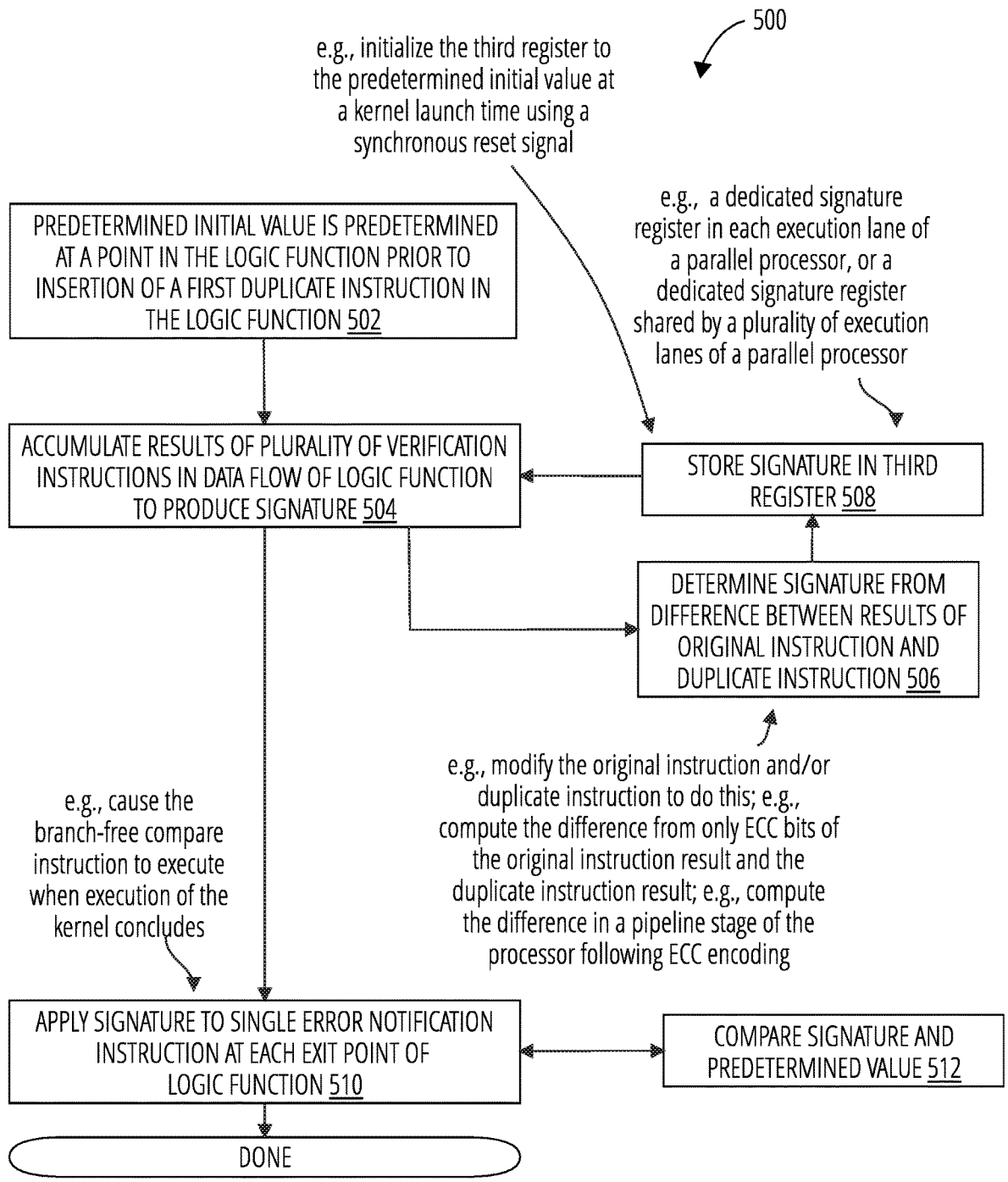
FIG. 5 illustrates another third-type integrity verifier 500 routine in accordance with one embodiment.

FIG. 5 illustrates a third-type integrity verifier 500 (herein, also called "FastSig") in accordance with one embodiment. The third-type integrity verifier 500 may be applied to reduce the overhead of the first- and second-type integrity verifiers 300 and 400. Instructions added to notify the upper layers of the system (e.g., adding a trap instruction) after every verification instruction can contribute significantly to performance overheads. To reduce this overhead, signature-based checking may be utilized.

In block 502, the "FastSig" third-type integrity verifier 500 accumulates results of a plurality of verification instructions in a data flow, e.g. for a particular logic function, to produce a signature (e.g., an up-down counter value). In block 504, the third-type integrity verifier 500 applies the signature to a single error notification instruction at each exit point of the logic function (e.g., the return or exit instruction of a function call or subroutine block of instructions).

Signature-based checking reduces the number of branch and trap instructions by accumulating (or chaining) the results to-be-verified instructions. A signature register (any physical or virtual register to hold the signature value) is initialized to a known value (e.g., zero) at the beginning of a logic function, and then the register values produced by each of the original instructions are added, and the results of duplicate instructions are subtracted, from this signature register. If the signature register is not equal to the initialized value at the end of the function, an error has occurred. If the signature update operations use fast and branch-free ISA instructions, this scheme can significantly reduce the error notification overhead from branch and trap instructions.

The LOP3 operations supported by current NVIDIA GPUs is well suited for performing signature accumulation. The LOP3 instruction has three source operations and supports creating any logical function. It may be utilized to find the bit-wise difference between the destination registers of the original and duplicate instructions (using XOR), and then OR the result with the signature register to update it. During fault-free execution, the signature register will remain zero (if it was initialized to zero). The LOP3 instruction may be utilized to verify register values and update the signature register with use of only one high-throughput instruction.

FIG. 6 illustrates various logic for verifying data flow integrity in a data processor, for a single original ADD instruction 602.

The first-type integrity verifier 300 ("SRIV") may in one embodiment generate naive verification logic 604. The second-type integrity verifier 400 ("DRDV") removes redundant verifications of register values that did not change subsequently. The third-type integrity verifier 500 ("Fast-Sig") may in one embodiment generate the signature verification logic 606-note this includes logic to initialize the signature, which is only generated only at the start of the function (any block of instructions to verify), and the signature register check at the exit of the logic function. For the original ADD instruction 602, only the additional ADD and LOP3 instructions are inserted, with the other instructions generated once for all verified instructions in the data flow of the logic function.

Two additional logic blocks are illustrated for use with hardware acceleration. They are accelerated compare and trap logic 608, and accelerated signature checking logic 610. These are described in further detail below.

To accelerate performance, a new branch-free instruction ("HW-Notify") that compares two values and raises a trap on a mismatch may be introduced. This instruction is shown in accelerated compare and trap logic 608 as LOP.xor.trap. This instruction can be used to accelerate both the first-type integrity verifier 300 ("SRIV") and second-type integrity verifier 400 ("DRDV"). The instruction replaces the signature update operation (LOP3) used by the signature verification logic 606, and it avoids the need to maintain a signature register. It provides low-latency error detection with full error containment, as errors are detected and reported before they become erroneous values written to memory.

The HW-Notify instruction is similar to either a logical operation (LOP) or a compare operation (ISET) except that it does not need a destination register. Hardware changes to implement HW-Notify in a data processor, such as a GPU, include instruction decoder support for the new operation and some logic in the register write-back stage to raise a trap based on the results of a bit-wise equality check. One of ordinary skill in the art would readily understand how to implement such modifications and they will not be described further.

Another hardware acceleration technique maintains and updates a dedicated signature register in each execution lane (a parallel hardware instruction execution path) of the data processor. The original and duplicate instructions update the signature by accumulating and subtracting their destination register values, respectively. Example logic using this technique ("HW-Sig") is accelerated signature checking logic 610.

One implementation of accelerated signature checking logic 610 uses binary Galois Field arithmetic (GF(2))7 that employs XOR operations for signature accumulation and subtraction. GF(2) arithmetic is commutative, easy to design in hardware, and requires low die area overhead. One extra metadata bit may be utilized in the instruction to indicate whether the signature register should be updated by the results of the instruction. Instructions that are not duplicated do not update the signature.

Once the result is generated and is being written back to the destination register for an instruction that needs to update the signature, the accelerated signature checking logic 610 updates the signature register with the result in parallel such that it is not in a critical execution path. Hence, the write-back stage may be a desirable place to maintain and update the signature register.

Because instructions in many implementations can write to one or two 32-bit registers, a 64 bit signature register may be desirable. The signature register may be initialized to zero at the GPU kernel launch time (e.g., using a synchronous reset signal) and checked that it is zero at the end of the kernel's life. At the end of the kernel's life, the register checking logic may be activated. If the value is non-zero at the end of the kernel, a trap is raised. In this approach, only one signature register is needed per hardware lane (not per thread), limiting the amount of storage needed per SM (SMs often support 1024 or 2048 threads).

To lower storage overhead, it may be desirable to accumulate the ECC bits of each result, instead of the result itself. In this implementation the signature register needs only to be as wide as the error code (e.g., 7 bit SEC-DED for 32 bit GPU registers). The signature update can take place in a pipeline stage following ECC encoding without performance concerns because this logic is not in the critical path of the data path.

An advantage of HW-Sig is that the hardware changes it requires are mostly limited to the write-back stage, making it a verification-friendly hardware change. This approach, however, does not detect the error until the end of the kernel's execution, which may be acceptable for workloads that execute many short running GPU kernels.

For code that executes on GPUs, and NVIDIA GPUs in particular, instruction replication can be implemented at several places in the compiler logic chain. While performing instruction replication early in the flow before PTX code is generated is perhaps easiest to implement algorithmically, later compiler optimization passes transform the program, changing the original code in ways that might eliminate some of the generated instructions.

Inserting the replicated and checking instructions directly into the compiler-generated SASS code ensures tight control over the final program binary, but involves re-implementation of logic that may already be implemented in the back-end compiler.

One solution is to implement the verification logic insertion within the back-end compiler (e.g., PTXAS), applying transformations on the intermediate logic generated there. The duplication algorithm runs after all the back-end optimizations are performed, but before the final instruction scheduling pass or register allocation. This approach leverages the production-quality instruction scheduler already implemented in the back-end compiler, which helps to lower the performance overheads of the duplication and verification code. It also enables instruction duplication on programs for which only the PTX code (rather than the original CUDA or OpenCL source code) is available.

Figure 7:
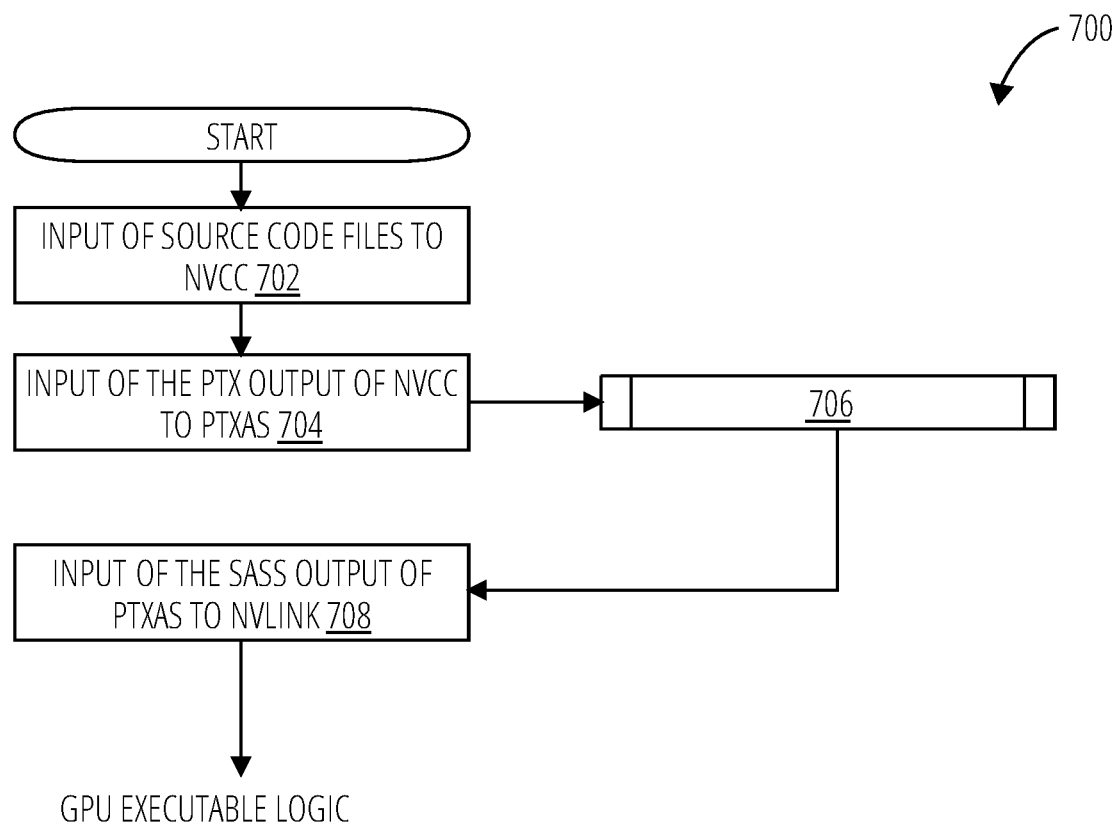
FIG. 7 illustrates a code compiler algorithm 700 and linker to generate executable code logic for NVIDIA® GPUs in accordance with one embodiment.

FIG. 7 illustrates a code compiler algorithm 700 and linker to generate executable logic for NVIDIA® GPUs in accordance with one embodiment. Code compiler algorithm 700 illustrates one embodiment of the compilation flow for NVIDIA GPU programs, including the instruction duplication pass. The code compiler algorithm 700 comprises the input of source code files to NVCC 702, the input of the PTX output of NVCC to PTXAS 704, which in turn involves invoking subroutine PTAX compiler pass 706 (further described in FIG. 8), and the input of the SASS output of PTXAS to NVLINK 708. Those familiar with NVIDIA GPU compilers will readily recognize these compiler and link stages. The code compiler algorithm 700 may be executed, for example, by the computing system 100.

Source programs are compiled using the front-end NVCC compiler to produce the virtual assembly code PTX. The back-end compiler PTXAS transforms the code into the final GPU-specific assembly code (SASS), which is then linked to libraries using the NVLINK linker. Instruction duplication runs after all the back-end optimizations in PTXAS. Although described for ahead-of-time compilation flow, a just-in-time (JIT) compiler can employ the same instruction duplication algorithms. The JIT compiler may be particularly well suited for auto-selection of the best technique for particular logic functions, as described below.

The algorithms to generate logic for the "SRIV" first-type integrity verifier 300, the "DRDV" second-type integrity verifier 400, or the "FastSig" third-type integrity verifier 500 operate at the intermediate representation (IR) in PTXAS, which is close in form to SASS assembly code. Because these algorithms run before register allocation, they operate on virtual registers and can easily create new registers which are later mapped to the limited set of physical registers.

In one embodiment, every duplication-eligible instruction is in fact duplicated, using a data-structure to track already-protected instructions so as not to duplicate them multiple times. Instructions that are not eligible for duplication include memory writes, control flow instructions, instructions that produce non-deterministic values, barrier spill/fill instructions, and instructions that write to pre-assigned physical registers.

Non-deterministic instructions—those where the replica and the original instruction would produce different values when executed—include S2R instructions that read special registers whose values change over time (e.g., the clock value), atomic operations, and volatile and non-cached memory reads. A load can be non-deterministic if there is a data race in the program.

Ideally, the code compiler algorithm 700 only marks the race-vulnerable loads as non-deterministic, however, identifying only this subset of loads is impractical. Instead, the code compiler algorithm 700 conservatively marks all generic, global, shared, texture, and surface loads as non-deterministic.

The code compiler algorithm 700 marks local and constant loads as deterministic because they can not participate in a data race by definition. Simple heuristics (that look for static atomic operations in a function) to identify loads that can potentially be non-deterministic are discussed further below.

A computer system may utilize logic to automatically select the algorithm ("SRIV" or "DRDV") that is expected to perform better at kernel launch time and employ the superior code duplication scheme, using the JIT compilation flow. The prediction algorithm may input (1) an occupancy estimate using kernel specific parameters such as registers needed per thread, shared memory usage, thread block size, and target GPU resource constraints, and (2) the increase in the number of static instructions that would result from a particular duplication technique being applied, and (3) the increase in static spill/fill instructions that would result. A Decision Tree Classifier may work well for the prediction task given these inputs.

Additional optimizations may be utilized in some implementations to further lower the performance overhead of the code duplication techniques described herein. Examples are leveraging verifiable program invariants (e.g. low-cost program-level detectors to reduce the amount of duplicated code, and verifying the result of expensive instructions such as DIV and SQRT using lower-cost inverse functions instead of duplicating them. For example, the result of the SQRT instruction may be multiplied with itself to verify that the product is same as the original input. This approach has been used by concurrent hardware checkers before and it is similar in principle to the do-not-duplicate-MOVs optimization, only applied to a wider variety of instructions.

Figure 8:
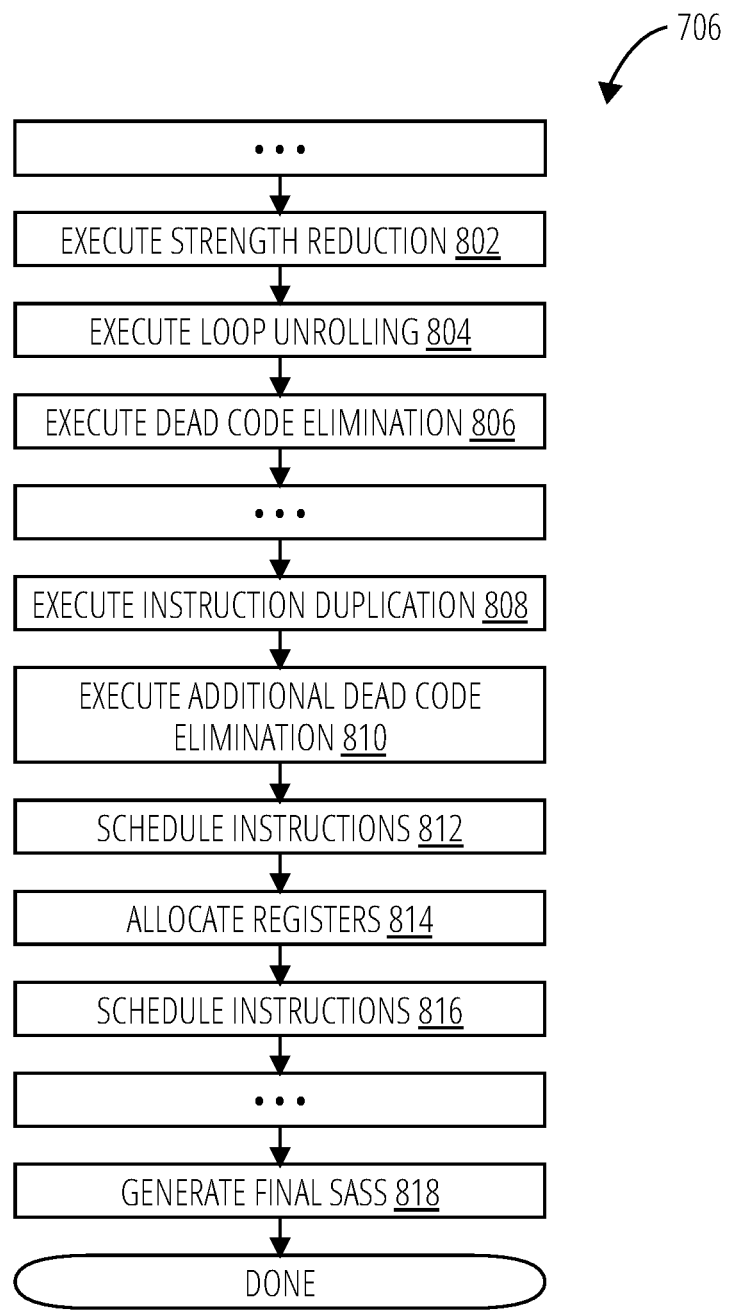
FIG. 8 illustrates a PTAX compiler pass 706 in accordance with one embodiment.

Referring to FIG. 8, in block 802, PTAX compiler pass 706 executes strength reduction. In block 804, PTAX compiler pass 706 executes loop unrolling. In block 806, PTAX compiler pass 706 executes dead code elimination. In block 808, PTAX compiler pass 706 executes instruction duplication. In block 810, PTAX compiler pass 706 executes additional dead code elimination. In block 812, PTAX compiler pass 706 schedules instructions. In block 814, PTAX compiler pass 706 allocates registers. In block 816, PTAX compiler pass 706 schedules instructions. In block 818, PTAX compiler pass 706 generates final SASS.

Interpretation

Terms used herein should be accorded their ordinary meaning in the relevant arts, or the meaning indicated by their use in context, but if an express definition is provided, that meaning controls.

"Circuitry" refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" refers to software logic embodied as processor-executable instructions stored in read-only memories or media.

"Hardware" refers to logic embodied as analog or digital circuitry.

"Logic" refers to machine memory circuits, non-transitory machine-readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

The techniques and integrity verifiers disclosed herein may be implemented by logic in various combinations of hardware, software, and firmware, depending on the requirements of the particular implementation.

"Programmable device" refers to an integrated circuit (hardware) designed to be configured and/or reconfigured after manufacturing. The term "programmable processor" is another name for a programmable device herein. Programmable devices may include programmable processors, such as field programmable gate arrays (FPGAs), configurable hardware logic (CHL), and/or any other type programmable devices. Configuration of the programmable device is generally specified using a computer code or data such as a hardware description language (HDL), such as for example Verilog, VHDL, or the like. A programmable device may include an array of programmable logic blocks and a hierarchy of reconfigurable interconnects that allow the programmable logic blocks to be coupled to each other according to the descriptions in the HDL code. Each of the programmable logic blocks may be configured to perform complex combinational functions, or merely simple logic gates, such as AND, and XOR logic blocks. In most FPGAs, logic blocks also include memory elements, which may be simple latches, flip-flops, hereinafter also referred to as "flops," or more complex blocks of memory. Depending on the length of the interconnections between different logic blocks, signals may arrive at input terminals of the logic blocks at different times.

"Software" refers to logic implemented as processor-executable instructions in a machine memory (e.g. read/write volatile or nonvolatile memory or media).

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Those skilled in the art will recognize that it is common within the art to describe devices or processes in the fashion set forth herein, and thereafter use standard engineering practices to integrate such described devices or processes into larger systems. At least a portion of the devices or processes described herein can be integrated into a network processing system via a reasonable amount of experimentation. Various embodiments are described herein and presented by way of example and not limitation.

Those having skill in the art will appreciate that there are various logic implementations by which processes and/or systems described herein can be effected (e.g., hardware, software, or firmware), and that the preferred vehicle will vary with the context in which the processes are deployed. If an implementer determines that speed and accuracy are paramount, the implementer may opt for a hardware or firmware implementation; alternatively, if flexibility is paramount, the implementer may opt for a solely software implementation; or, yet again alternatively, the implementer may opt for some combination of hardware, software, or firmware. Hence, there are numerous possible implementations by which the processes described herein may be effected, none of which is inherently superior to the other in that any vehicle to be utilized is a choice dependent upon the context in which the implementation will be deployed and the specific concerns (e.g., speed, flexibility, or predictability) of the implementer, any of which may vary. Those skilled in the art will recognize that optical aspects of implementations may involve optically-oriented hardware, software, and or firmware.

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein. The techniques and procedures described herein may be implemented via logic distributed in one or more computing devices. The particular distribution and choice of logic will vary according to implementation.

In a general sense, those skilled in the art will recognize that the various aspects described herein which can be implemented, individually or collectively, by a wide range of hardware, software, firmware, or any combination thereof can be viewed as being composed of various types of circuitry.

What is claimed is:

1. An integrity verifier comprising:
   logic to identify an original instruction in a thread of a logic function for a processor, the original instruction writing a first result to a first register;
   logic to duplicate the original instruction into a duplicate instruction in the thread and to insert the duplicate instruction into the logic function, the duplicate instruction reading from the same one or more source register as the original instruction and writing a second result to a second register; and
   logic to insert into the logic function a branch-free compare instruction at one or more exit point of the logic function, the branch-free compare instruction an instruction that compares, in a single instruction, the first result and the second result and raises an alert if there is a mismatch.

2. The integrity verifier of claim 1, wherein the alert is raised to a runtime event handler.

3. The integrity verifier of claim 1, further comprising logic to:
   skip MOV instructions during instruction duplication; and
   verify integrity of the MOV instructions by comparing source registers and destination registers assigned to the MOV instructions.

4. The integrity verifier of claim 1, wherein the branch-free compare instruction replaces a LOP3 instruction.

5. An integrity verifier comprising:
   logic to identify an original instruction in a logic function for a processor, the original instruction writing a first result to a first register;
   logic to duplicate the original instruction into a duplicate instruction and to insert the duplicate instruction in the logic function, the duplicate instruction reading from the same one or more source register as the original instruction and writing a second result to a second register;
   logic to accumulate, for a plurality of original instructions and a plurality of duplicate instructions, a difference between the first result and the second result as a signature in a third register; and
   logic to insert a branch-free compare instruction at an exit point of the logic function, the branch-free compare instruction raising an alert if the signature does not equal a predetermined initial value.

6. The integrity verifier of claim 5, wherein the predetermined initial value is predetermined at a point in the logic function prior to insertion of a first duplicate instruction in the logic function.

7. The integrity verifier of claim 5, further comprising:
the third register is a dedicated signature register in each execution lane of a parallel processor.

8. The integrity verifier of claim 5, further comprising:
the third register is a dedicated signature register shared by a plurality of execution lanes of a parallel processor.

9. The integrity verifier of claim 5, wherein binary Galois Field arithmetic utilizing XOR operations is utilized to generate the signature.

10. The integrity verifier of claim 5, further comprising:
logic to modify one or both of the original instruction and duplicate instruction to cause the third register to be updated by the difference of the first result and the second result.

11. The integrity verifier of claim 5, further comprising:
logic to initialize the third register to the predetermined initial value at a kernel launch time using a synchronous reset signal and to cause the branch-free compare instruction to execute when execution of the kernel concludes.

12. The integrity verifier of claim 5, further comprising:
logic to compute the difference from only ECC bits of the first result and the second result.

13. The integrity verifier of claim 12, further comprising:
logic to compute the difference in a pipeline stage of the processor following ECC encoding.

14. An integrity verifier comprising:
logic to identify an original instruction in a logic function for a processor, the original instruction writing a first result to a first register;
logic to duplicate the original instruction into a duplicate instruction and to insert the duplicate instruction in the logic function, the duplicate instruction reading from the same one or more source register as the original instruction and writing a second result to a second register; and
logic to:
insert into the logic function a branch-free compare instruction that compares, in a single instruction, the first result and the second result and raises an alert if there is a mismatch;
skip MOV instructions during instruction duplication; and
verify integrity of the MOV instructions by comparing source registers and destination registers assigned to the MOV instructions.

15. The integrity verifier of claim 14, wherein the alert is raised to a runtime event handler.

16. The integrity verifier of claim 14, wherein the branch-free compare instruction replaces a LOP3 instruction.

* * * * *